United States Patent
Alhazmi et al.

(10) Patent No.: US 12,533,633 B2
(45) Date of Patent: Jan. 27, 2026

(54) FIRED EQUIPMENT EXHAUST RECOVERY SYSTEM

(71) Applicant: SAUDI ARABIAN OIL COMPANY, Dhahran (SA)

(72) Inventors: Shadi M. Alhazmi, Hofuf (SA); Ahmad M. Alahdal, Hofuf (SA); Hamed S. Alsowayigh, Mubarraz (SA); Abdullraheem U. Almulla, Hofuf (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 679 days.

(21) Appl. No.: 17/932,923

(22) Filed: Sep. 16, 2022

(65) Prior Publication Data

US 2024/0091704 A1    Mar. 21, 2024

(51) Int. Cl.
*B01D 53/86*    (2006.01)
*B01J 19/00*    (2006.01)
*B01J 19/24*    (2006.01)

(52) U.S. Cl.
CPC ......... *B01D 53/869* (2013.01); *B01D 53/864* (2013.01); *B01D 53/8671* (2013.01); *B01D 53/8696* (2013.01); *B01J 19/0013* (2013.01); *B01J 19/245* (2013.01); *B01D 2255/1021* (2013.01); *B01D 2255/1023* (2013.01); *B01D 2255/1025* (2013.01); *B01D 2255/1026* (2013.01); *B01D 2255/20746* (2013.01);
(Continued)

(58) Field of Classification Search
CPC ..... C07C 29/00; C07C 1/12; C01B 2203/062; C01B 2203/0244; B01D 83/869; B01D 2255/1021; B01D 2255/1023; B01D 2255/1025; C10G 3/30
See application file for complete search history.

(56) References Cited

U.S. PATENT DOCUMENTS

| 9,885,257 B2 | 2/2018 | Bergins et al. |
| 2016/0153316 A1 | 6/2016 | Bergins et al. |

FOREIGN PATENT DOCUMENTS

WO    2021251471 A1    12/2021

OTHER PUBLICATIONS

First Examination Report issued by Saudi Arabian Patent Office for corresponding Saudi Arabian patent application No. SA 123450362, mailed Sep. 11, 2024 (12 pages).
(Continued)

*Primary Examiner* — Jafar F Parsa
(74) *Attorney, Agent, or Firm* — Osha Bergman Watanabe & Burton LLP

(57) ABSTRACT

A system and a process for reducing greenhouse gas emissions are disclosed herein. The system may include a combustion zone, a catalytic converter, a methanation reactor, a compressor, a normal venting unit, a vacuum protection unit, and a control system. The process may include feeding a fuel, a methane-containing gas, and an oxygen-containing gas into a first reactor unit, and producing a combustion products stream comprising carbon monoxide, carbon dioxide, and water. The process may include cooling the combustion products stream via a cooling system, feeding the cooled exhaust stream and hydrogen to a second reactor unit. The second reactor unit may include a first catalyst for reacting oxygen with carbon monoxide to form carbon dioxide, and a second catalyst for reacting carbon dioxide with hydrogen to produce methane. The process may include recovering an effluent from the second reactor unit and feeding it to the first reactor unit.

12 Claims, 4 Drawing Sheets

(52) U.S. Cl.
CPC .. *B01D 2257/502* (2013.01); *B01D 2257/504* (2013.01); *B01J 2219/00051* (2013.01); *B01J 2219/00162* (2013.01); *B01J 2219/00164* (2013.01); *B01J 2219/00186* (2013.01); *B01J 2219/00225* (2013.01); *B01J 2219/00245* (2013.01)

(56) References Cited

OTHER PUBLICATIONS

Hupa, "Recovery Boiler Gas Emissions and Emission Control," Abo Akademi—Turku, Finland, TAPPI Kraft Recovery Course, Jan. 7-10, 2008, Tampa, Florida, 18 pages.

FIRED EQUIPMENT EXHAUST RECOVERY SYSTEM

BACKGROUND

Modern society has been experiencing global warming and climate change since industrialization, with steadily increasing concentrations of greenhouse gases in the atmosphere. Specifically, human activities have exponentially increased the abundance of heat-trapping gases in the atmosphere that have, in turn, created a greenhouse effect. Such heat-trapping gases are called "greenhouse gases". A greenhouse gas has the ability to absorb light and radiate heat instead of reflecting it, elevating the temperature of the gas. There is growing interest in greenhouse gases such as international regulatory movements through climate agreements, and carbon dioxide is the largest volume gas of these greenhouse gases. Therefore, reducing carbon dioxide gas in the atmosphere is of particular interest when developing technologies for reducing the greenhouse effect.

Carbon dioxide is a naturally occurring compound that is present in Earth's atmosphere. Carbon dioxide in the atmosphere may be derived from natural sources, such as respiration, or from human activities, including from industrial processes including the combustion of fossil fuels. As such, it is necessary to provide systems and methods that reduce the amount of carbon dioxide gas in the atmosphere as well as minimize the amount of carbon dioxide gas released into the atmosphere from industrial processes. In efforts to slow down global warming, carbon capture, carbon storage, and carbon conversion technologies have emerged as possible solutions for reducing carbon dioxide in the atmosphere. However, an efficient solution to the excess carbon dioxide problem is to find a way to convert carbon dioxide into useful chemicals. Carbon dioxide is the most common carbon source on the planet, and therefore, converting it into a useful substance that can be reused will have an enormous impact on the climate and economy. Carbon dioxide is one of the main causes of global warming, so reducing the emission of carbon dioxide in the atmosphere is key to reducing the extent of global warming.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments herein relate to methods and systems for reducing carbon dioxide emissions from fired equipment, such as boilers, furnaces, and fired reactors, among others. Owing to outstanding carbon dioxide convertibility, embodiments herein may remarkably reduce the release of carbon dioxide due to the combustion of fossil fuels, recirculating carbon dioxide into high-energy fuel through economically feasible processes.

In one aspect, embodiments disclosed herein relate to a process for reducing greenhouse gas emissions in fired equipment. The process may include feeding a fuel, a methane-containing gas, and an oxygen-containing gas into a first reactor unit; and producing a combustion products stream from the first reactor unit. The combustion products stream may comprise carbon monoxide, carbon dioxide, and water. The process may then include cooling the combustion products stream via a cooling system to produce a cooled exhaust stream and then feeding the cooled exhaust stream and hydrogen to a second reactor unit. The second reactor unit may include a first reaction zone containing a catalyst for catalytically reacting oxygen with carbon monoxide to form carbon dioxide. The second reactor may also include a second reaction zone containing a catalyst for reacting carbon dioxide with hydrogen to produce methane and converting at least 80% of the carbon dioxide to methane. The process may then include recovering an effluent from the second reactor unit comprising methane and carbon dioxide and feeding the effluent to the first reactor unit as the methane-containing gas.

In other aspects, embodiments disclosed herein relate to a system for reducing greenhouse gas emissions. The system may include a combustion zone, a catalytic converter, a methanation reactor, a compressor, a normal venting unit, a vacuum protection unit, and a control system. The combustion zone may include a fuel inlet and an oxygen gas inlet. The fuel inlet may be configured to feed a hydrocarbon fuel and a methane-containing gas into the combustion zone. The oxygen gas inlet may be configured to feed an oxygen-containing gas into the combustion zone. The combustion zone may be configured to react the hydrocarbon fuel and the methane-containing gas with the oxygen-containing gas to produce a first exhaust stream comprising carbon monoxide, carbon dioxide, and water. The catalytic converter may include a first exhaust inlet and a first catalyst. The catalytic converter may be configured to feed the first exhaust stream into the catalytic converter. The first catalyst may have an activity for converting carbon monoxide to carbon dioxide. The catalytic converter may be configured to convert carbon monoxide into carbon dioxide and produce a second exhaust stream comprising carbon dioxide and water. The methanation reactor may include a second exhaust inlet and a second catalyst. The second exhaust inlet may be configured to feed the second exhaust stream into the methanation reactor. The second catalyst may have an activity for reacting carbon dioxide with hydrogen to form methane. The methanation reactor may be configured to react carbon dioxide with hydrogen and to convert at least 80% of the carbon dioxide to methane to produce a third exhaust stream comprising methane. The compressor may be configured for receiving, compressing, and feeding the third exhaust stream to the fuel inlet as the methane-containing gas. The normal venting unit may be disposed intermediate the methanation reactor and the compressor and configured to selectively divert a portion or an entirety of the third exhaust stream away from the compressor. The vacuum protection unit may be disposed intermediate the normal venting unit and the compressor. The vacuum protection unit may have a suction section and a discharge section and may be configured to maintain the third exhaust stream at a pressure above a minimum set point pressure. The control system may be configured to control the opening and closing of the normal venting unit.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

Certain aspects of the presently disclosed subject matter will be described with reference to the accompanying draw

Figure 1:
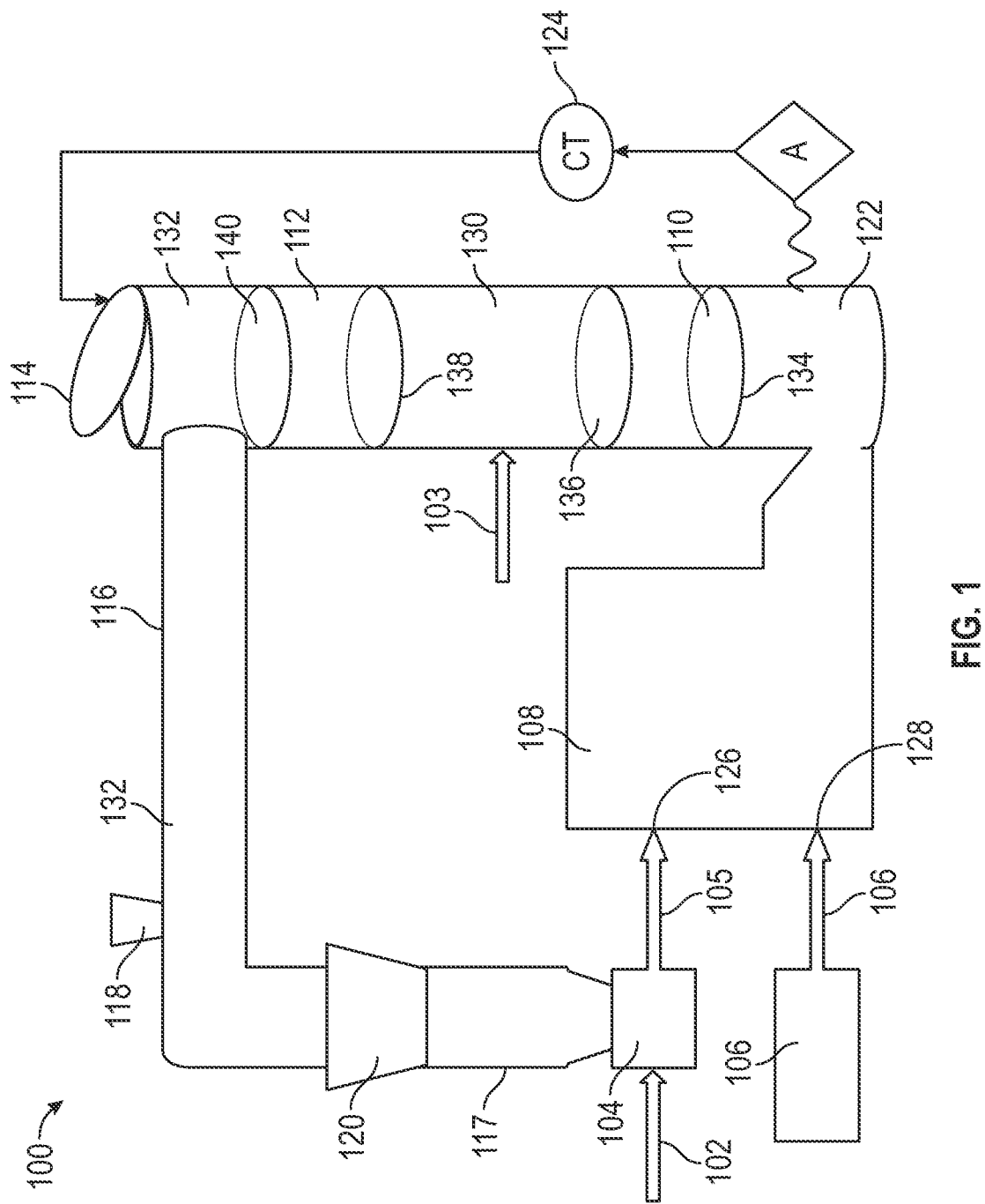
- FIG. 1 illustrates an overview of a system for reducing greenhouse gas emissions according to embodiments herein.

While the subject matter disclosed is susceptible to various modifications and alternative forms, specific embodiments have been shown by way of example in the Drawings and are described in detail. It should be understood, however, that the Detailed Description is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments presented herein relate to systems and methods that may be used by entities, such as corporations or companies, to reduce their greenhouse gas emissions and to move toward or potentially reach net-zero emissions. More specifically, embodiments herein relate to methods and systems for reducing carbon dioxide emissions from fired equipment, such as boilers, furnaces, and fired reactors, among others. In general terms, the exhaust gases from the fired equipment may be sequentially processed to convert carbon monoxide to carbon dioxide and to convert carbon dioxide to methane, producing a methane-containing gas stream. The methane-containing gas stream may then be used as a fuel feedstock and dilution gas in the fired equipment, thus cyclically combusting and producing methane.

By cyclically consuming and producing a fuel, embodiments disclosed herein provide for processes that may reduce greenhouse gas emissions. The greenhouse gas emissions that are primarily targeted by the present disclosure are carbon monoxide and carbon dioxide gases. The systems and processes may include, as noted above, a first reactor unit including a combustion zone for combusting the fuel and the methane-containing gas, as well as a second reactor containing one or more reaction zones for converting carbon monoxide to carbon dioxide and for converting carbon dioxide to methane.

The systems and processes may include several additional processing units, including but not limited to a compressor, mixers, heat exchangers, venting units, pressure control units, and pipelines or flow conduits for connecting the processing units and transporting the respective fluids. For example, a compressor may be provided for pressurizing the methane-containing gas for feed to the combustion zone; other means for supplying the methane-containing gas to the combustion zone, such as a venturi mixer for mixing a hydrocarbon fuel with the recirculating methane-containing gas, may also be used. As another example, one or more heat exchangers or cooling systems may be provided for recovering heat from the combustion and reaction products, where at least one of the heat exchangers may be positioned to control an inlet temperature of the exhaust gas to the second reactor. With respect to flow conduits used for transporting fluids used in the system, examples may include a hydrogen supply and a hydrogen feed stream for supplying hydrogen to the second reactor, an oxygen-containing gas supply, and an oxygen-containing gas feed stream for supplying oxygen to the combustion zone, as well as flow conduits connecting a combustion zone outlet to an inlet of the second reactor and connecting an outlet of the second reactor to an inlet of the combustion zone, where the connections may be direct or indirect. As yet another example, a mixer or distributor may be provided for mixing the hydrogen with the combustion products effluent from the combustion zone, and a mixer for mixing the fuel and the methane-containing gas. Other various equipment or unit operations that may be used with embodiments herein may include a normal venting unit, a vacuum protection unit, a condenser, and a control system, among others. Various embodiments will be described further below with respect to the overall system and the equipment and unit operations that may be used according to embodiments herein.

Embodiments herein may thus include feeding a fuel, a methane-containing gas, and an oxygen-containing gas into a combustion reactor, producing a combustion products stream. The combustion products stream may be recovered as an exhaust from the combustion reactor and may include carbon dioxide, carbon monoxide, and water, among other combustion byproducts and inerts passing through the system. The combustion products stream may be cooled via a cooling system to produce a cooled exhaust stream, such as via heating or pre-heating one or more process streams, such as combustion air, hydrocarbon fuel feed, water, steam, or other process streams that may be passed through a heating coil disposed in the radiant or convective zone of the combustion reactor. The cooled exhaust stream may be at a temperature sufficient for contact with the catalyst within the second reactor. The cooled exhaust stream and hydrogen may be fed to the second reactor, where the carbon monoxide may be converted to carbon dioxide over a first catalyst, and where the carbon dioxide and hydrogen may react over a second catalyst to produce methane. In some embodiments, at least 80 mol % or at least 90 mol % of the carbon dioxide may be converted to methane. An effluent may be recovered from the second reactor containing methane and carbon dioxide, among other combustion products and inerts, when used. The effluent from the second reactor unit may then be fed to the combustion zone for combustion of the methane as a fuel source in the fired equipment, thus continuing the cyclic combustion and production of methane.

As a more specific example of fired equipment that may benefit from embodiments herein, a boiler for converting water to steam using combustion as a heat source may include feeding a fuel and air into the combustion zone of the first reactor unit, producing a combustion products stream (exhaust stream). A water stream passed through heating coils of the boiler may be heated by the radiant and convective heat from the combustion zone, such as within one or more heating coils disposed in the radiant and/or convective zone of the combustion reactor, thereby producing a steam stream and cooling the combustion exhaust stream. The process may further include passing the combustion products stream through a first reaction zone of the second reactor, and contacting the combustion products with one or more catalysts for converting any carbon monoxide contained in the combustion products to carbon dioxide. If necessary, one or more additional heat exchangers may be provided intermediate the combustion zone and the first reactor to further cool the exhaust stream to a temperature suitable for contact of the exhaust stream with the catalyst. Following conversion of the carbon monoxide, the process then may include mixing hydrogen with the catalytically converted exhaust stream to produce a mixed exhaust stream. The process further may include feeding the mixed exhaust stream to a second reaction zone of the second reactor unit, which may include a methanation catalyst for reacting the hydrogen and carbon dioxide to produce methane. As the catalytic conversion of carbon monoxide to carbon dioxide is exothermic, if necessary, one or more additional heat exchangers may be provided intermediate the first and second reaction zones of the second reactor to cool the catalytically converted exhaust to a temperature suitable for contact with the methanation catalyst. The process may then include converting the mixed exhaust stream into a hot treated exhaust stream in the presence of the methanation catalysts, the hot treated exhaust stream including methane and carbon dioxide, among other combustion products, and reaction by-products and inerts, when used. If necessary, prior to the return of the methane-containing hot treated exhaust stream to the combustion zone as a fuel source, embodiments herein may include cooling of the hot treated exhaust stream via one or more heat exchangers, such as additional heating coils disposed in the flow conduit transporting the treated exhaust stream to the combustion zone. Where the treated exhaust stream is to be cooled sufficiently to result in condensation of water, embodiments herein may include a condenser to produce a cold-treated exhaust stream and a knock-out drum or collection zone to recover a condensed water stream. Finally, the process may include feeding the cold-treated exhaust stream to the combustion zone of the first reactor.

The water supplied to the combustion zone of the first reactor unit may be fresh water, deionized water, produced water, or process water. In one or more embodiments, the water supplied to the combustion zone may be boiler feed water. The boiler feed water may be indirectly heated using energy provided by exothermic reactions in the first reactor unit.

The fuel fed to the combustion zone of embodiments herein may include one or more carbon-rich fuels, such as coal, wood, hydrocarbons, including methane, ethane, propane, natural gas, and other light hydrocarbons, as well as heavier hydrocarbons or mixtures of various hydrocarbons. Solid fuels such as coal or wood may be fed as a slurry in some embodiments.

The oxygen supplied to the combustion zone of the first reactor unit may include air, oxygen-enriched air, or purified oxygen, among other oxygen sources commonly used for combustion. As needed for a particular embodiment, an upstream air supply unit or air purification unit may be provided.

The combustion zone of the first reactor unit may be a furnace, boiler, or other fired unit operation. The combustion zone of the first reactor unit may be configured to combust any combustible mixture, such as a feed comprising hydrocarbon fuel with oxygen from the air and produce an exhaust stream. The exhaust stream may comprise combustion products including carbon monoxide, carbon dioxide, and water, among other components, such as nitrogen when air is used as an oxygen supply.

The reaction zone(s) of the second reactor may include one or more catalysts for the conversion of carbon monoxide to carbon dioxide and one or more catalysts for the conversion of carbon dioxide and hydrogen to methane. The reaction zone(s) may include mixed catalysts for performing both reactions in the same reactor or may be provided as reaction zones in series for converting carbon monoxide and then for converting carbon dioxide.

In some embodiments, the second reactor may include a first reaction zone that may be a catalytic converter that is configured to facilitate the reaction of carbon monoxide with oxygen and produce carbon dioxide in the presence of one or more catalysts. The catalyst for the catalytic conversion of carbon monoxide to carbon dioxide may include one or more of platinum, palladium, and rhodium, for example.

The second reactor may also include a second reaction zone that may be a methanation reactor unit for reacting carbon dioxide with hydrogen in the presence of one or more catalysts to produce methane. The methanation catalysts may include one or more of ruthenium and cobalt, for example.

The mixed exhaust stream may be introduced into the second reactor unit and contacted with one or more catalyst zones in the second reactor unit to convert the carbon dioxide to methane. The methane-containing exhaust stream produced in the second reactor may be returned to the combustion zone of the first reactor unit to be combusted, the system and process thus cyclically making and combusting methane. In addition to the methane, fuel may be provided to the combustion zone of the first reactor unit to ensure sufficient heat generation for the required process. Depending upon the fuel source, appropriate burners in the combustion zone of the first reactor may be provided to collectively or separately burn the fresh fuel and the cyclically produced methane.

As described above, the first reactor unit, the combustion zone, produces an exhaust gas including carbon dioxide and carbon monoxide. Additionally, the second reactor unit may include a first reaction zone for converting carbon monoxide to carbon dioxide, such as via a reaction with excess or unreacted oxygen passing through the first reactor unit, and a second reaction zone for converting the carbon dioxide and added hydrogen to methane.

Hydrogen supplied to the second reactor unit may be provided at a stoichiometric, less than stoichiometric, or greater than stoichiometric ratio for reaction with the carbon dioxide. In some embodiments, combustion of methane and any unreacted hydrogen is acceptable, and a greater than stoichiometric hydrogen may be provided. In other embodiments, stoichiometric or less than stoichiometric hydrogen may be provided to the second reactor unit. When hydrogen supplied to the methanation reactor unit or methanation reaction zone is above the stoichiometric ratio, an excess of hydrogen may be present after the methanation reaction. Such excess or unutilized hydrogen may be combusted with oxygen in the combustion zone to produce heat and water. This excess hydrogen may thus be considered as a fuel source and should not affect the stability of the combustion and catalytic reactions. In one or more embodiments, to facilitate the conversion of carbon dioxide to methane, hydrogen may be added to the combustion products upstream of the reaction zone in the second reactor, such as upstream of the reaction zone(s) containing the methanation catalyst.

The reactions involved (carbon monoxide to carbon dioxide and carbon dioxide to methane) are both exothermic reactions that may be performed at a temperature in a range from about 550° F. to about 800° F., such as from about 600° F. to about 750° F. or from about 650° F. to about 720° F. Pressures maintained within the second reactor unit(s) are not particularly limited, but in some embodiments may be within the range from about 25 to about 50 psig, such as from about 30 to about 45 psig or from about 35 to 40 psig. For example, the catalyst zone for converting carbon monoxide to carbon dioxide may be at a temperature of about 675° F. and a pressure of about 40 psig, and the catalyst zone for converting carbon dioxide to methane may be at a temperature of about 650° F. and a pressure of about 35 psig.

Combustion of the fuel within the first reactor unit (such as a fire box) may result in a combustion product having a temperature in excess of 1500° F. The energy in the combustion products may be used for various unit operations, and a portion of the energy may be transferred via radiant and convective heat transfer to process streams, such as to evaporate boiler feed water, provide heat for a reaction, heat a heat transfer medium, or other functions. Energy in the exhaust streams may also be used to heat various streams, such as a water stream, a steam stream, a fuel stream, a hydrocarbon-containing stream, and/or an oxygen-containing gas, such as for preheating the fuel or combustion air supplied to the first reactor unit, or for preheating of other process streams prior to their passage through the radiant zone. The energy transfer may reduce the temperature of the combustion products, and heat transfer coils located in the radiant or convective zones of the first reactor unit may be used to reduce the temperature of the combustion products to the desired temperature at an inlet of the second reactor unit. Further, one or more heat transfer coils may be provided intermediate or within catalyst zones of the second reactor unit, thereby withdrawing energy provided by the exothermic reactions and controlling the temperature within the reaction zones. Such heat transfer coils may be used for pre-heating the process stream fed to the radiant zone of the first reactor unit, for example, or may be used to heat other various streams that may be associated with the overall plant.

Following the conversion of carbon dioxide to methane, the converted combustion stream may still be at an elevated temperature. Additional heat exchange coils may be used to extract additional heat and cool the converted combustion stream further. In embodiments where the temperature of the converted combustion stream is reduced sufficiently low to result in condensation of water, a knockout drum may be provided to separate the condensed water from the converted combustion stream prior to circulating the converted combustion stream, comprising methane, back to the first reactor unit.

A reaction zone of the second reactor unit, as noted above, may include a catalyst or a catalyst bed for reacting oxygen with carbon monoxide to produce carbon dioxide. Suitable catalysts for facilitating the conversion of carbon monoxide to carbon dioxide may include platinum, palladium, and/or rhodium-containing catalysts. In some embodiments, other catalyst combinations may be used for the conversion of carbon monoxide to carbon dioxide, for example, rhodium with alumina. Additionally, the second reactor unit or methanation reactor or methanation zone may include a catalyst or a catalyst bed for reacting carbon dioxide with hydrogen to produce methane. Suitable catalysts for facilitating conversion of the carbon dioxide may include ruthenium and/or cobalt-containing catalysts. In some embodiments, other catalyst combinations may be used for the methanation reaction, for example, copper with manganese. Various additional catalytic conversion and methanation catalysts are known in the art and may be used according to the embodiments herein. The catalysts may be provided as supported catalysts and may be disposed within a reaction zone as a fixed bed of catalyst in some embodiments.

It has been found that appropriate catalysts, pressure management, and heat management within the second reactor(s) may result in greater than 80%, greater than 85 mol %, or greater than 90 mol % conversions of the carbon dioxide in the exhaust stream to methane. For example, in some embodiments, 85 to 92 mol % of the carbon dioxide in the exhaust stream may be converted to methane.

As described above, not all of the carbon dioxide may be converted to methane in one cycle. Further, depending upon the oxygen supply, such as when air is used, the exhaust may contain nitrogen, among other atmospheric air components. Nitrogen gas, being a significant portion, such as about 79% of the atmospheric air supply, does not take part in the reactions that occur in the burners of the first reactor unit. After multiple reaction cycles of carbon dioxide to methane conversion, the nitrogen concentration present in the burners of the first reactor may reach a limit that may need to be vented to the atmosphere to eliminate the possibility of flame-out. Even with oxygen-enriched air or purified oxygen, water, carbon dioxide, nitrogen, and other components in the system may build to a point where flame out may occur.

To avoid undesirable build-up and flame out, embodiments herein may provide for the removal of inerts and combustion products from the cyclic combustion-methane production system. In some embodiments, for example, combustion products may be vented from the system upstream of the second reactor. However, as it is also desirable to maintain overall plant efficiency and to recover heat from the combustion, diversion of exhaust flow or a portion of the exhaust flow early in the cyclic process may be undesirable; while heat may be captured via coils in separate flow systems (diversion and cyclic), the increase in capital to do so may also be undesirable. To provide for efficient heat recovery, in other embodiments combustion products may be vented from the system downstream of the second reactor. In either case, embodiments herein may aim to minimize the carbon dioxide produced from the fired units, and thus any materials vented from the cyclic combustion-methane generation system may in some embodiments be passed to a system for conversion, capture, or sequestration of the carbon dioxide in the vented exhaust stream.

Venting of inerts downstream of the second reactor, following hydrogen mixing and methane generation, may also be performed without venting of either hydrogen or methane, according to some embodiments herein. Loss of methane or hydrogen and the possible introduction of these flammable components to the atmosphere would be undesirable. Rather, an intermittent flow of hydrogen to maintain the concentration of carbon dioxide and other inerts in the system may be used. Accordingly, systems herein may include a control system, sensors, and valves to stop hydrogen feed and methane production in advance of venting of the inerts from the system via a normal venting mechanism, and then to restart hydrogen feed and methane production when sufficient inerts have been vented.

In some embodiments, for example, cyclic combustion and methane production may proceed, with all of the fired equipment exhaust circulating through the second reactor for methane production and subsequent combustion. As the cyclic combustion-methane production continues, carbon dioxide, being at less than complete conversion, and nitrogen, introduced with the air, will each increase in concentration within the circulating materials.

Flow rate sensors, pressure sensors, and/or gas detectors may be used to estimate or measure the concentration of the carbon dioxide and nitrogen circulating within the system. The measurements from the sensors and detectors may be transmitted to a control system that may be used to control valves within the system. When the amount of inerts reaches a set point value, the hydrogen flow may be temporarily stopped or may be ramped down, to halt methane production. The set point value may be set so that as methane diffuses from the catalyst in the methanation reaction zone, recirculating of exhaust may continue while maintaining the inerts below a concentration at which flame out may occur. When hydrogen flow and methane production are zero, the control system may then open the normal venting mechanism, diverting exhaust flow from the combustion zone, venting inerts from the system, and returning the inerts to a lower concentration. After "burping" the inerts from the system, the normal venting mechanism may be closed, hydrogen flow may be ramped up or started, and the cyclic combustion-methane production may resume.

Methane production from the exhaust, at 80 mol % or 90 mol % or greater conversion of carbon dioxide, may account for a significant amount of the fuel fed to the combustion zone. When methane production is stopped or ramped down in advance of inert venting, fresh fuel feed may be increased so as to maintain combustion and heat generation rates within the combustion zone. Similarly, as hydrogen flow is restarted and methane production resumes, fresh fuel feed may be decreased so as to maintain combustion and heat generation rates within the combustion zone. Control systems according to embodiments herein may thus be configured for receiving transmitted sensor data, and, based on the sensor data, determining a concentration of inerts circulating within the system, and sending control signals to maintain combustion, heat generation rates, and avoid flame out.

For example, during cyclic combustion-methane production, based upon the determined concentration of inerts, or a rate of change of the concentration of the inerts within the system, the control system may send signals to perform one or more actions, such as: closing a hydrogen feed valve (decreasing a hydrogen feed rate), opening a normal venting mechanism (releasing inerts from the cyclic combustion-methane production process), opening a fuel feed valve (to increase a fresh fuel feed rate and maintain sufficient radiant and convective heat generation rates). The opening of the normal venting mechanism may also be based on a measured or estimated methane concentration downstream of the reaction zone. The control system may also be configured to send signals to maintain proper operations of other equipment associated with the cyclic combustion-methane production process, such as heat exchangers, condensers, and compressors associated with the return of the methane-containing gas from the second reactor to the combustion zone, accounting for the decreased circulation through the system.

As a further example, during the venting period, based upon the determined concentration of inerts, or a rate of change of the inerts concentration within the system, the control system may send signals to perform one or more actions, such as: closing a normal venting mechanism (resuming the cyclic combustion-methane production process), opening a hydrogen feed valve (increasing a hydrogen feed rate), closing a fuel feed valve (to decrease a fresh fuel feed rate and maintain sufficient radiant and convective heat generation rates). Closing of the normal venting mechanism may also be based on a measured or estimated methane concentration downstream of the reaction zone upon re-start of hydrogen feed. The control system may also be configured to send signals to maintain proper operations of other equipment associated with the cyclic combustion-methane production process, such as heat exchangers, condensers, and compressors associated with the return of the methane-containing gas from the second reactor to the combustion zone.

The process may also include controlling the normal venting unit to open and close on demand (based on multiple factors) via a control system. The factors for demand may include the rate of conversion of carbon dioxide to methane, the temperature of the catalytic converter, the temperature of the methanation reactor, and such. The control system may also be configured to perform startup and shutdown procedures.

In one or more embodiments, the process may include releasing built-up nitrogen through a normal venting unit. Embodiments herein may provide for venting built-up nitrogen to the atmosphere to prevent flame-out within the system, maintaining the concentration of fuel and oxygen fed to the combustion zone within the flammable range, between the lower flammability limit and the upper flammability limit, providing a ratio of fuel to oxygen sufficient to support the desired combustion. As the flammable range may vary based on the fuel, the control system should be configured accordingly based on the fresh fuel being used and the recirculating methane. In some embodiments, for example, a normal venting period may be triggered when the concentration of nitrogen is over 50% of the total gaseous content in the system.

Embodiments herein may alternatively or additionally provide for venting a portion of the combustion products to the atmosphere to prevent excessive build-up of inert components within the system. For example, a portion of the combustion exhaust may be provided to the methane-generation reaction zone while another portion of the combustion exhaust may be vented through a normal venting mechanism.

As noted above, the cyclic venting and fuel production associated with the system may result in circulation rates from the second reactor back to the combustion zone cycling between no or low flow to full combustion zone exhaust rates. A compressor that may be used to increase a pressure of the methane-containing gas to combustion zone feed pressures may thus experience swings in flow rates through the compressor. To prevent the compressor from pulling a significant vacuum on the recirculation system components, a vacuum protection device may be disposed intermediate the normal venting mechanism and the compressor. If the pressure within the system drops below a set point pressure, the vacuum protection unit may open, allowing gases, such as stored exhaust or other appropriate gases into the system so as to alleviate the vacuum and any possible strain on compressor operations.

Accordingly, the process may further include preventing over-compression of the cold-treated exhaust stream by passing through a vacuum protection unit before feeding to the combustion zone of the first reactor unit. The vacuum protection unit may be configured to pull a portion of the cold-treated exhaust stream and discharge it into the atmosphere via a discharge section. A pre-set pressure value for the cold-treated exhaust stream may determine whether the vacuum protection unit would be open or closed. For an example, if the pressure of the cold treated exhaust stream falls at or below the pre-set pressure value, or operational value, the operation of the vacuum protection unit may shut down. Alternatively, if the pressure of the cold-treated exhaust stream rises above the pre-set pressure value or operational value, the operation of the vacuum protection unit may begin.

As outlined above, embodiments disclosed herein relate to a system for reducing greenhouse gas emissions. The disclosed system may be a fired system producing minimal greenhouse gas emissions. FIG. 1, as shown, illustrates an overview of a fired system for reducing greenhouse gas emissions according to embodiments herein. The system 100 may include a compressor 120, a mixer 104, a combustion zone 108, a catalytic converter 110, a methanation reactor 112, a vacuum protection unit 118, a normal venting unit 114, a control system 124, and associated flow conduits.

The mixer 104 may be configured to mix a hydrocarbon fuel stream 102 and a methane-containing gas stream passed through the flow line 117 to produce a mixed fuel stream 105. The hydrocarbon fuel inlet 126 may be configured as one or more injectors (not illustrated) to feed the mixed fuel stream 105 into the combustion zone 108. The oxygen-containing stream inlet 128 may be configured to feed an oxygen-containing stream 106 such as air into the combustion zone 108.

The combustion zone 108 may include the hydrocarbon fuel inlet 126, and an oxygen-containing stream inlet 128. The combustion zone 108 may be configured to burn the hydrocarbon fuel, providing radiant and convective energy to one or more process streams (not illustrated), where the combustion may result in a first exhaust stream 122 (the combustion product mixture) containing carbon monoxide, carbon dioxide, water, and other gases at a high temperature, such as in excess of 1500° F.

The first exhaust mixture may then be passed through one or more reactors or reaction zones to oxidize the carbon monoxide and methanize the carbon dioxide. As illustrated in FIG. 1, the first exhaust stream 122 is passed through a first fixed bed reactor, catalytic converter 110 containing a catalyst for converting carbon monoxide to carbon dioxide, and the effluent from catalytic converter 110 is mixed with hydrogen stream 103 and passed through a second fixed bed reactor, methanation reactor 112 containing a catalyst for reacting hydrogen and carbon dioxide to produce methane. In the embodiment as illustrated in FIG. 1, the catalytic reaction zones including the catalytic converter 110, and the methanation reactor 112 may be disposed within the exhaust stack of the fired equipment, the exhaust stack being inclusive of flow elements and reaction zones intermediate to the combustion zone 108 and normal venting unit 114 as illustrated. Heating coils (not illustrated) may also be disposed within the exhaust stack described above.

The catalytic converter 110 may include a first exhaust inlet 134 or a catalyst support screen configured to introduce and distribute the first exhaust stream 122 into the catalytic converter 110. The catalytic converter 110 may include a first catalyst that can facilitate conversion of carbon monoxide into carbon dioxide in the presence of oxygen, producing a second exhaust stream 130 recovered via catalytic converter outlet 136. In one or more embodiments, the catalytic converter 110 may have a configuration that maximizes the surface area where reactions can take place while providing a relatively small pressure drop, such as 10 psi or less, 7 psi or less, or 5 psi or less, such as from 0.5 to 5 psi. The second exhaust stream 130 may comprise carbon dioxide and water which may then be mixed with hydrogen stream 103 and introduced into the methanation reactor 112.

The methanation reactor 112 may include a second exhaust inlet 138 or catalyst support screen that is configured to introduce and distribute the second exhaust stream 130 into the methanation reactor 112. The methanation reactor 112 may include a second catalyst that can facilitate a methanation reaction of carbon dioxide with hydrogen. This methanation reaction may produce methane and water, resulting in a third exhaust stream 132 comprising unreacted carbon dioxide, methane, and water, among other components, recovered via reaction zone outlet 140. Similar to the catalytic converter, in one or more embodiments, the methanation reactor may be a fixed bed of catalyst having a configuration that maximizes the surface area where reactions can take place while providing a relatively small pressure drop, such as 10 psi or less, 7 psi or less, or 5 psi or less, such as from 0.5 to 5 psi. The third exhaust stream 132 comprising methane may be utilized as a portion of the hydrocarbon fuel stream into the combustion zone 108. The third exhaust stream 132 may be compressed in compressor 120 and fed into the mixer 104 whereas the third exhaust stream 132 may mix with the hydrocarbon fuel stream 102 to produce the mixed fuel stream 105.

The normal venting unit 114 may be positioned downstream of methane production, such as intermediate the methanation reactor 112, and the vacuum protection unit 118. The normal venting unit 114 may be configured to open or close, during startup, normal operations, and shut down, based on one or more conditions that may include catalyst temperature, carbon dioxide conversion, hydrogen composition, methane composition, and inert composition, and opening and closing of the normal venting unit may be controlled for diverting a portion or the entirety of the third exhaust stream 132, or recirculating the produced methane to mixer 104, as described above. In one or more embodiments, the normal venting unit 114 may be configured to feed the diverted exhaust to a methane and/or carbon capture unit (not illustrated), thereby capturing the produced methane for subsequent use as a fuel and/or capturing the carbon dioxide for alternative conversion processes or sequestration.

The vacuum protection unit 118 may be positioned intermediate the normal venting unit 114 and the compressor 120. The vacuum protection unit 118 may comprise a suction section and a discharge section, which may be configured to prevent over-compression of the third exhaust stream 132. For example, when the pressure of the third exhaust stream 132 is above a pre-set, operational value, such as a pressure range from about 20 to 60 psig, the vacuum pressure may be in a range from about 1 to 15 psig. These pressure ranges may be dependent on the compressor design of the surge pressure. The vacuum protection unit 118 may be configured to utilize the suction section to pull a portion of the third exhaust stream 132 from the flow line 116 and pass it through the discharge section of the vacuum protection unit 118. When the pressure of the third exhaust stream 132 falls at or below the pre-set, operational value, the operation of vacuum protection unit 118 may shut down. The vacuum protection unit 118 may prevent over-compression processes that could be caused by a pump or compressor 120 herein, or due to low fuel burning. The vacuum protection unit 118 may also be used to protect the system in the event of the over-formation of carbon monoxide, carbon dioxide, or methane.

Embodiments herein may include an analyzer connected to the vacuum protection unit that is configured to measure the concentration of nitrogen in the system. Flow rates, gas analyzers, or other sensors may be utilized to provide a measurement or estimate of the nitrogen concentration in the circulating exhaust stream. For example, an analyzer "A" may be used to measure a concentration of nitrogen in the exhaust stream 122 and to provide the measurement to the control system 124, which in turn may be used to operate the normal venting unit 114, among other system operations as described above.

When the concentration of nitrogen reaches a set point value, hydrogen stream 103 supply may be stopped, therefore, ending the shift reaction that may occur in the methanation reactor 112. Therefore, when the normal venting unit 114 is opened to release exhaust into the atmosphere, methane production may be close to zero or zero within the second reactor unit. The disclosed process may thus be cyclic in methane production and utilize the normal venting unit for operation without interruptions or concern with flame out.

In particular embodiments, the catalytic converter 110, and the methanation reactor 112 may be located in the exhaust stack. The system may be provided with a normal venting unit 114 downstream of the catalyst beds. A circulation system, inclusive of flow line 116, compressor 120, and flow line 117, among other components, may be provided to return the cooled treated exhaust stream to the combustion zone. A hydrogen supply (not illustrated) that supplies the hydrogen stream 103 may be used to provide hydrogen intermediate the two catalyst beds. When using air as the oxygen source, nitrogen may also get introduced to the system, as already discussed. Thus, nitrogen may accumulate in the system during the methane production cycles of the operation. The cooled treated exhaust stream that contains nitrogen, may flow through the circulation system to the combustion reaction. This process may be considered as (i) a partially closed-loop process. As the cyclic process continues, nitrogen may build within the system, and to avoid possible flame out within the combustion zone, the cooled treated exhaust stream may be vented to the atmosphere. Thus, systems herein may also be considered as (ii) a partially open loop process.

The system may be operated under (i) the partially closed-loop process, when the following are desired: catalytic conversion of carbon monoxide to carbon dioxide, and catalytic conversion of carbon dioxide to methane, and return of the methane-containing exhaust to the combustion reaction zone to combust the produced methane with any excess or unreacted hydrogen. When the concentration of nitrogen and nitrogen-based compounds reach at or above a certain nitrogen pre-set limit (within a lower combustion limit or nitrogen safety margin), or the concentration of oxygen in the combustion zone falls at or below a certain oxygen pre-set limit (oxygen safety margin), the system may be switched from being operated under (i) the partially closed-loop process to (ii) the partially opened loop process. As used herein, the oxygen safety margin or the limiting oxygen index may be the minimum oxygen content required to support flaming combustion, and to allow time to avoid venting hydrogen or methane.

When the system operates under the (i) the partially closed-loop process, the flow of fresh fuel fed to the system may need to be decreased to maintain the amount of energy in the combustion reaction zone. When the system operates under the (ii) the partially opened loop process, the flow of fuel fed to the system may need to be increased to compensate and provide the desired amount of energy in the combustion reaction zone. In order to control the flow of hydrogen, fuel feed and oxygen into the process, a plurality of sensors to measure their concentration in the cyclic streams and controllers to control their flow rates may be utilized, as discussed. Measurements of hydrogen, fuel feed, and oxygen concentrations may provide an indication of when the concentration of hydrogen and/or methane have reached zero. For example, when the concentration of hydrogen and/or methane have reached zero, then the catalytically converted exhaust stream comprising carbon dioxide may be vented to the atmosphere through utilizing the normal venting unit 114.

Similar to the above, measurements may provide an indication of when nitrogen levels have returned to or close to a normal combustion baseline level, or a pre-set level at which point the process may be transitioned back to methane production. Thus, the system may switch back to the (ii) the partially opened loop process from (i) the partially closed-loop process, as discussed above. When the system operates under the (ii) the partially opened loop process, the flow of hydrogen to the system may be stopped, the methanation reaction may also be stopped. Thus, resulting in no methane production, and no methane or hydrogen circulation in the system. When no methane is being produced, or circulated in the system, the catalytically converted exhaust may be diverted for (i) the partially closed-loop process. As the measurements signal that there is no methane being produced, or circulated in the system, hydrogen flow may be started to begin feeding into the system for the production of methane. As more hydrogen and fuel are fed to the system, methane production increases, and the concentration of methane rises in the exhaust stream from the second reactor. Thus, fuel feed rates may need to be decreased to compensate the increase of methane in the circulating stream to the combustion zone of the first reactor unit.

The control system may be configured to appropriately control the operations needed for the cyclic methane production and the system to operate with a normal venting unit 114. For oxygen-enriched feeds, such as a "pure" oxygen feed or a nitrogen-depleted air feed, or for where carbon dioxide or other impurities may build within the system and could affect flame stability, similar measurements and controls may be used to cycle between normal venting and methane production. The control system 124 may be configured to control the opening and closing of the normal venting unit 114 based on the rate of conversion of carbon dioxide to methane, on the temperature of the catalytic converter 110, and/or the methanation reactor 112. In some embodiments, for example, the control system 124 may be configured to perform startup and shutdown procedures. In one or more embodiments, the system 100 may include one or more sensors "A" and a controller CT. Various sensors and measurement devices that may be used include temperature sensors, pressure sensors, flow rate sensors, and sensors to measure a composition of a stream. These various sensors may be positioned, for example, upstream, within, and/or downstream of reaction zones including the catalytic converter 110, and the methanation reactor 112. In some embodiments, temperature sensors located within or immediately downstream of a catalyst bed may be used to measure or estimate a temperature of the catalyst within the catalyst bed. Similarly, compositional measurements may be taken, for example, to measure a carbon monoxide content of second exhaust stream 130. Compositional measurements may also be taken, for example, to measure a hydrogen, methane, or carbon dioxide content of the third exhaust stream 132. In addition to controlling the normal venting unit 114, the control system may additionally be configured to control operation of various control valves within the system, such as those for controlling flow rates of the fuel, the oxygen or air, and the hydrogen, as well as compressor speed, among others (not illustrated).

As a non-limiting example of control configurations for startup and shutdown of the system 100, the control system may be configured to control a position of the normal venting unit 114, among other unit operations. During startup, for example, the combustion in the firebox may be initiated, producing a flue gas. Initially, the normal venting unit 114 may be in an open position so that the third exhaust stream is diverted (not recirculated to the mixer 104). The exhaust stream passing over and through the catalyst in reactor units including the catalytic converter 110, and the methanation reactor 112 may result in an increase in the catalyst temperature. Catalytic conversion of the carbon monoxide will occur based on excess oxygen in the combustion product stream, when the catalyst in catalytic converter 110 reaches a sufficient reaction temperature. Hydrogen flow may also be started upon methanation reactor 112 reaching an initial set point temperature, such as 600° F., initiating the methanation reaction converting carbon dioxide to methane in reactor 112. Once hydrogen flow is initiated, or conversions and temperatures are at a minimum level (methane detected downstream of reaction zone, methanation reactor 112, for example) or at a desired level, such as greater than 80% $CO_2$ conversion or greater than 90% $CO_2$ conversion, then the control system may send a signal to close the normal venting unit 114, routing the methane-containing gas to the compressor 120 and mixer 104, and normal operations with circular methane combustion and production, as described above, may be conducted.

When it is desired to shut down the unit, the control system may be configured to stop hydrogen flow, thereby decreasing methane production in methanation reactor 112. Increasing a hydrocarbon fuel stream 102 feed rate (fuel sweetening) may be used to maintain combustion at a desired rate within the combustion zone 108. As a result, methane production in reactor 112 decreases, and methane and hydrogen concentrations within the third exhaust stream 132 will fall. Upon reaching a nil hydrogen content and/or a nil methane content in the system, the control system may send a signal to open the normal venting unit 114. With absence of the exothermic reactions, the temperature of the catalysts in catalytic converter 110 and the methanation reactor 112 will decrease, and normal firebox shutdown procedures may be followed.

Figure 2:
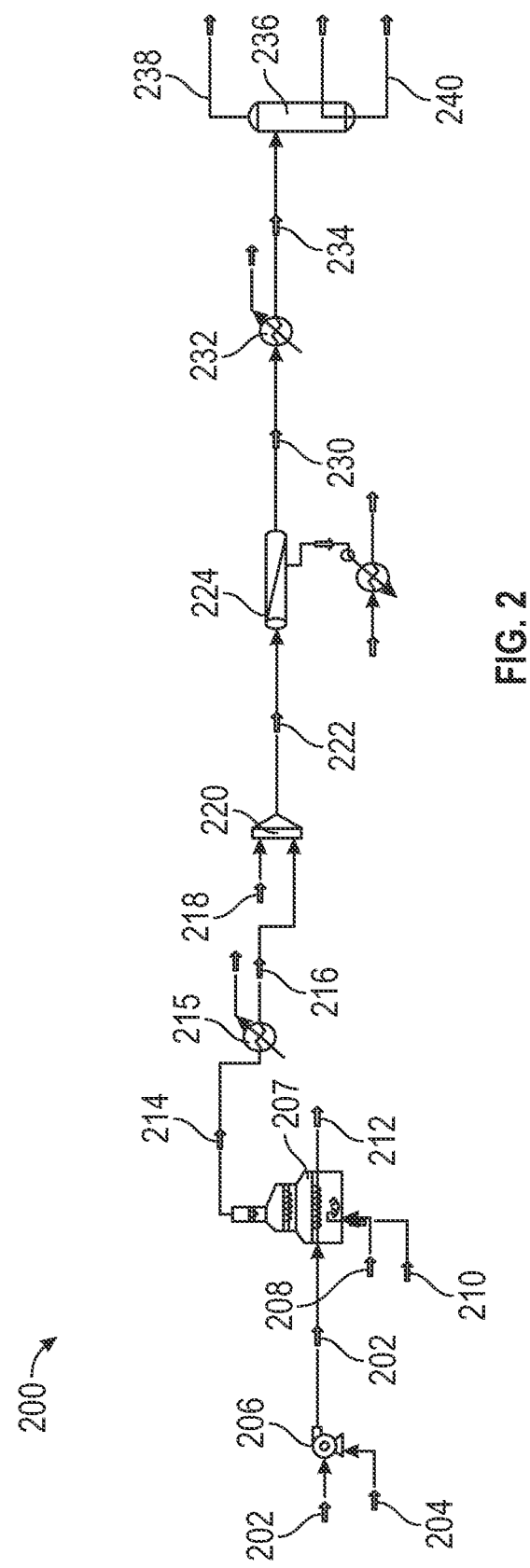
FIG. 2 illustrates a detailed process flow diagram of a system for reducing greenhouse gas emissions according to embodiments herein.

FIG. 2, as shown, illustrates a detailed process flow diagram of a system 200 for reducing greenhouse gas emissions. The system 200 includes a pump 206, a first reactor unit 207, a cooling system 215, a mixer 220, a second reactor unit 224, a condenser 232, a vessel 236, and several pipelines connecting the process units. While the components may be associated with various fired equipment, as illustrated the process includes first feeding a boiler feed water stream 202 into pump 206 through a pipeline into the first reactor unit 207 (a boiler, for example). A power source 204, which may be electric, pneumatic, or hydraulic, provides energy for pump 206 to run. The process flow diagram of the system 200 also includes feeding a hydrocarbon fuel stream 208 and an air stream 210 into the first reactor unit 207, providing energy to the water and producing a steam stream 212, as well as producing a combustion products stream 214.

The process then includes cooling the combustion products stream 214 via the cooling system 215 to produce a cooled exhaust stream 216. The boiler feed water stream 202 can be indirectly heated using energy provided by exothermic reactions in the first reactor unit 207. The process also includes mixing a hydrogen gas stream 218 with the cooled exhaust stream 216 in the mixer 220 to produce a mixed exhaust stream 222. The process further includes feeding the mixed exhaust stream 222 to the second reactor unit 224. The second reactor unit 224 includes one or more catalysts, as described above, for the conversion of carbon monoxide to carbon dioxide, and for the conversion of carbon dioxide to methane. The process includes converting the mixed exhaust stream 222 into a hot treated exhaust stream 230 in the presence of the catalysts and then cooling the hot treated exhaust stream 230 via the condenser 232 to produce a cold-treated exhaust stream 234 comprising methane. The boiler feed water stream 202 can also be indirectly heated using energy provided by exothermic reactions in the second reactor unit 224. Finally, the process includes feeding the cold-treated exhaust stream 234 into the vessel 236. The vessel 236 separates cold-treated exhaust stream 234 into an overhead stream of a treated exhaust stream 238 containing methane and a bottoms water-containing stream 240. Although not illustrated in FIG. 2, the treated exhaust stream 238 may be returned to the first reactor unit 207 as part of the hydrocarbon fuel stream 208.

In one or more embodiments, the first reactor unit 207 may be a gas-fired power plant, a boiler, a thermal cracker, or any unit in a plant where a combustion process is used to provide radiant and/or convective heat to a feed stream for heating, phase change, or reaction.

In one or more embodiments, the first reactor unit 207 may be a firebox comprising a radiant zone, a convective zone, and an exhaust zone. The first reactor unit 207 may be configured to facilitate a combustion reaction where hydrocarbons present in the hydrocarbon fuel stream 208 react with oxygen present in the air stream 210 to produce carbon monoxide, carbon dioxide, and water.

In one or more embodiments, the hydrogen gas stream 218 may be supplied from an associated process plant that is using the first reactor unit 207 to provide energy.

In one or more embodiments, the first reactor unit 207 may operate at a stoichiometric or greater than stoichiometric oxygen supply. As such, there may be enough oxygen remaining in the combustion product formed by burning hydrocarbons with oxygen in the first reactor unit 207 to further react with the carbon monoxide in the second reactor unit 224. Carbon monoxide produced in the first reactor unit 207 may be converted into carbon dioxide in the presence of a catalyst. One or more catalysts may be present for this reaction in the second reactor unit 224. The catalysts may be selected from platinum and/or cobalt having spherical shapes.

In one or more embodiments, the reaction of carbon monoxide with oxygen in the second reactor unit 224 may occur at a temperature in a range from about 550 to 800° F., or such as 600 to 750° F., or such as from 650 to 700° F. In one or more embodiments, the reaction of carbon monoxide with oxygen in the second reactor unit 224 may occur at a pressure within the range from about 25 to about 50 psig, such as from 30 to about 45 psig, or such as from about 25 to about 35 psig. For example, the catalyst zone for converting carbon monoxide to carbon dioxide may be at a temperature of about 650° F. and a pressure of about 30 psig, In one or more embodiments, the temperature of the second reactor unit 224 may be maintained in a temperature range from about 550 to 800° F. In case of overheating of any of the second reactor unit 224, the flow rate of the air stream 210 may be manipulated to utilize the excess heat by heating the air and therefore, reduce the temperature of the second reactor unit 224.

In one or more embodiments, the cooling system 215 may comprise indirect heat exchange coils in the exhaust zone and the convective zone for removing heat from the combustion products stream 214. The removed heat may be utilized for preheating the boiler feed water stream 202. In one or more embodiments, the condenser 232 comprises indirect heat exchange coils in the exhaust zone and the convective zone for removing heat from the hot treated exhaust stream 230. The removed heat may then also be utilized for preheating the boiler feed water stream 202.

In some embodiments, the second reactor unit 224 may include one or more reaction zones or catalyst zones, such as a fixed, fluidized, or motive bed of catalyst. In some embodiments, the second reactor unit may include one or more fixed beds of catalyst for performing the desired reactions, where the catalyst beds may be arranged within an exhaust stack or a flue gas stack receiving combustion products from the first reactor unit 207. As fired operations vary, and the extent to which heating or preheating coils are located within the convective zone and exhaust stack, the exact location of the catalytic reaction zones may vary and should be located appropriately within the system to provide an appropriate catalyst zone reaction temperature. The catalytic reaction zones may be positioned in different places within the system based on the flow rate of the exhaust. For example, two catalytic reaction zones may be fitted inside the second reactor unit 224, while the associated equipment may be connected as standalone equipment, e.g., the condenser 232 and the vessel 236.

In one or more embodiments, the second reactor unit 224 may be a plug flow reactor where the mixed exhaust stream 222 is continuously fed into at one end and the hot treated exhaust stream 230 is continuously removed from the other end. One or more catalysts may be present in the second reactor unit 224. The catalysts may be ruthenium, and/or cobalt. In the presence of the catalysts, the second reactor unit 224 may facilitate the catalytic conversion of carbon monoxide to carbon dioxide as well as a methanation reaction where carbon dioxide reacts with hydrogen to produce methane, therefore the treated exhaust stream 238 may comprise methane.

In one or more embodiments, the system 200 may further include using the treated exhaust stream 238 as a portion of the hydrocarbon fuel stream 208 fed into the first reactor unit 207. In one or more embodiments, production, and recycling of the treated exhaust stream 238 comprising methane as a portion of feed may minimize the fresh fuel usage from the hydrocarbon fuel stream 208.

A plurality of pressure sensors may be utilized throughout the system to monitor fluid pressure. For a non-limiting example, a first sensor may be positioned after the pump 206 to monitor the pressure of the boiler feed water stream 202. A second sensor may be positioned on the combustion products stream 214 to monitor the pressure of the combustion products. A third sensor may be positioned on the first exhaust stream 122 to monitor the pressure of the mixed exhaust. A fourth sensor may be positioned on the hot treated exhaust stream 230 to monitor the pressure of the hot treated exhaust. A fifth sensor may be positioned on the treated exhaust stream 238 to monitor the pressure of the treated exhaust stream.

A plurality of temperature sensors may be utilized throughout the system to monitor the fluid temperature. For a non-limiting example, a first temperature sensor may be positioned after the pump 206, a second temperature sensor may be positioned on the combustion products stream 214, a temperature sensor may be positioned on the first exhaust stream 122, a fourth temperature sensor may be positioned inside the first reactor unit 207, a fifth temperature sensor may be positioned on the first exhaust stream 122, a sixth temperature sensor may be positioned on the hot treated exhaust stream 230, and a seventh temperature sensor may be positioned on the treated exhaust stream 238 to monitor their temperature.

Figure 3:
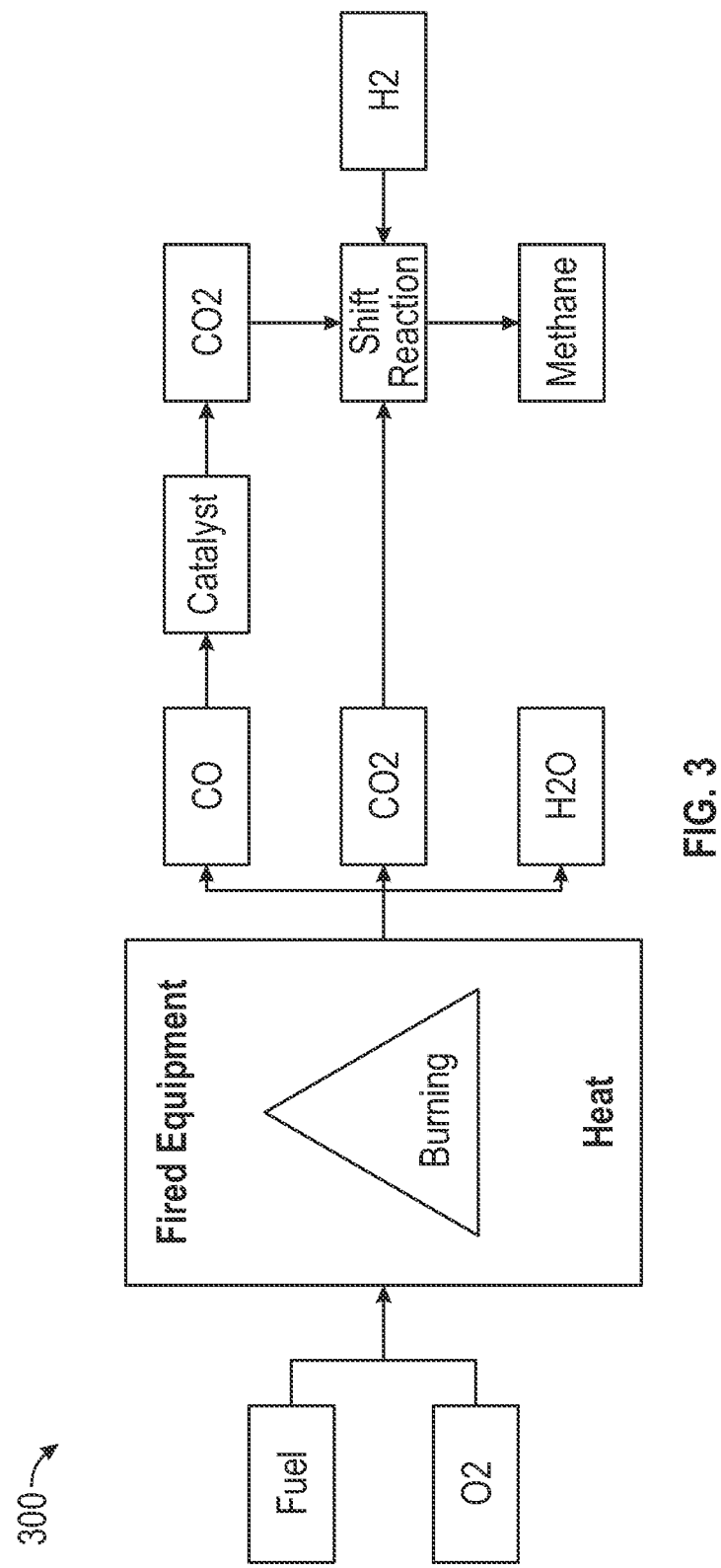
FIG. 3 is a process flow chart of the reactions for reducing greenhouse gas emissions according to embodiments herein.

FIG. 3, as shown, illustrates a process flow chart 300 of the reactions for reducing greenhouse gas emissions according to one or more embodiments herein. Fuel and oxygen ($O_2$) are fed into a fired equipment, which is heated to react the fuel with oxygen and produce combustion products, referred to as "burning" herein. The combustion reaction produces carbon monoxide (CO), carbon dioxide ($CO_2$), and steam ($H_2O$). In the presence of a catalyst, carbon monoxide then reacts to form carbon dioxide. Then the total carbon dioxide produced from the two reactions passes through a shift reaction with hydrogen ($H_2$) that produces methane.

Figure 4:
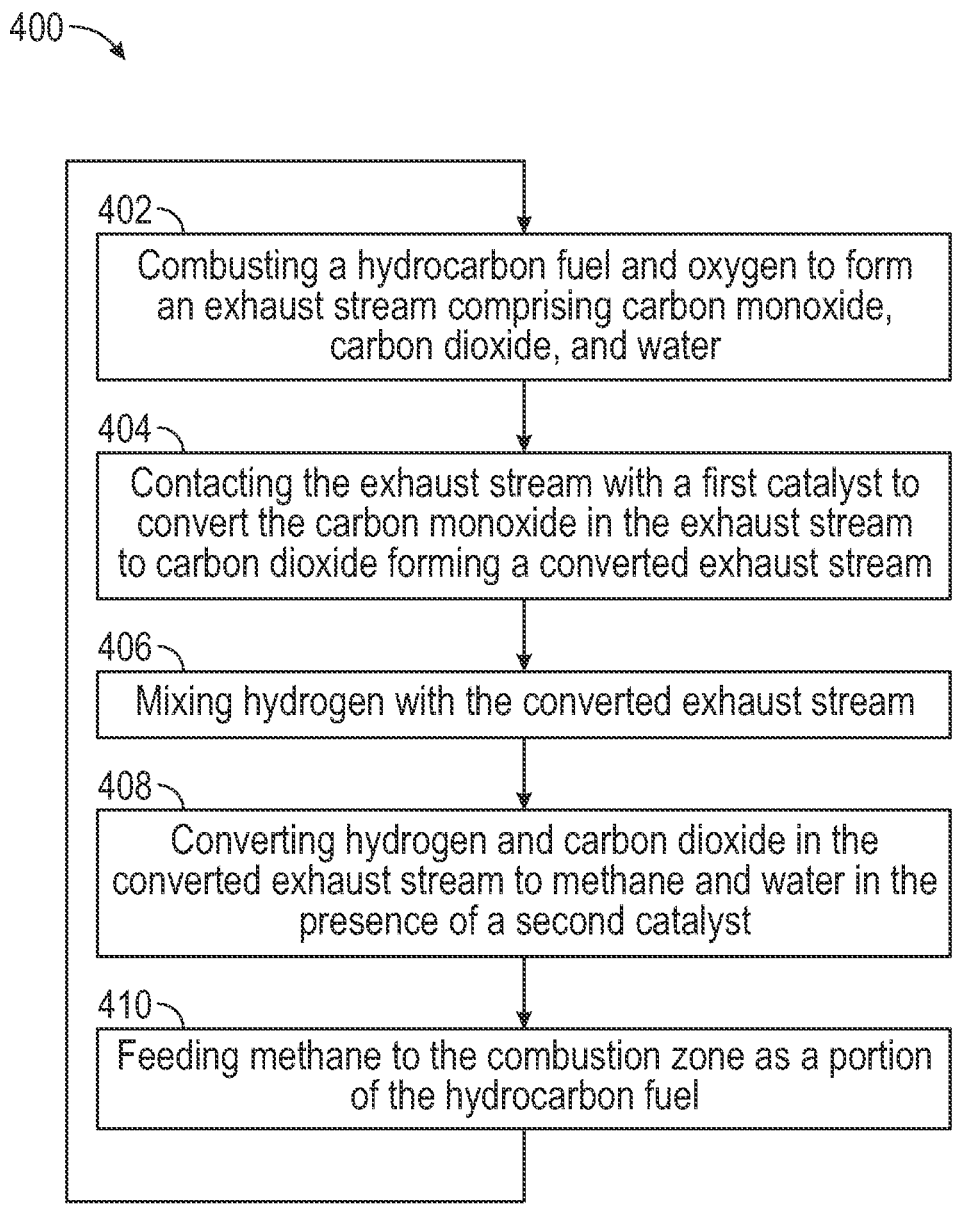
FIG. 4 is a schematic illustration of the method steps for reducing greenhouse gas emissions according to embodiments herein.

In yet another aspect, embodiments disclosed herein relate to a method for reducing greenhouse gas emissions. FIG. 4, as shown here, illustrates a method 400 for reducing greenhouse gas emissions according to one or more embodiments herein. The method 400 may include, in step 402, combusting a hydrocarbon fuel and oxygen to form an exhaust stream comprising carbon monoxide, carbon dioxide, and water in a combustion zone. In step 404, the method 400 may include contacting the exhaust stream with a first catalyst to convert the carbon monoxide in the exhaust stream to carbon dioxide, forming a converted exhaust stream in a catalytic converter. The method 400 then may include mixing hydrogen with the converted exhaust stream in step 406. In step 408, the method 400 may include converting hydrogen and carbon dioxide in the converted exhaust stream to methane and water in the presence of a second catalyst in a methanation reactor. Finally, the method 400 may include step 410, which is feeding the produced methane to the combustion zone as a portion of the hydrocarbon fuel.

In one or more embodiments, the first catalyst in the step 404 may comprise platinum and/or cobalt. In one or more embodiments, the reaction of carbon monoxide with oxygen in step 404 may occur at a temperature in a range from 650 to 720° F. In one or more embodiments, the reaction of carbon monoxide with oxygen in step 404 may occur at a pressure below 40 psig.

In one or more embodiments, the second catalyst in step 408 may comprise ruthenium and/or cobalt. In one or more embodiments, the reaction of carbon dioxide with hydrogen to produce methane in step 408 may occur at a temperature below 700° F. In one or more embodiments, the reaction of carbon dioxide with hydrogen to produce methane in step 408 may occur at a pressure below 35 psig.

Embodiments of the present disclosure may provide at least one of the following advantages. The disclosed system may reduce the emitted gases from the stacks of fired equipment. Boiler operations may be enhanced by utilizing the disclosed process to effectively reduce or eliminate the greenhouse gas emissions from the boiler. The disclosed system may be used in a wide variety of plants including but not limited to gas plants, refineries, petrochemical processing plants, and oil-producing facilities. The formed methane may be reused as fuel which may, therefore, reduce or minimize fresh fuel usage. In summary, the present invention may remarkably reduce the amount of carbon dioxide generated in the atmosphere caused by excessive use of fossil fuels due to the excellent conversion activity to carbon dioxide and may recycle carbon dioxide into a high-energy renewable fuel by an economical process.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

When the words "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims. Thus, particular implementations of the subject matter have been described. Other implementations are within the scope of the following claims.

What is claimed as new and desired to be protected by Letters Patent is:

1. A process for reducing greenhouse gas emissions in fired equipment, the process comprising:
    feeding a fuel, a methane-containing gas, and an oxygen-containing gas into a first reactor unit;
    producing a combustion products stream from the first reactor unit, the combustion products stream comprising carbon monoxide, carbon dioxide, and water;
    cooling the combustion products stream via a cooling system to produce a cooled exhaust stream;
    feeding the cooled exhaust stream and hydrogen to a second reactor unit, the second reactor unit comprising a first reaction zone containing a catalyst for catalytically reacting oxygen with carbon monoxide to form carbon dioxide and a second reaction zone containing a catalyst for reacting carbon dioxide with hydrogen to produce methane, and converting at least 80% of the carbon dioxide to methane;
    recovering an effluent from the second reactor unit comprising methane and carbon dioxide; and
    feeding the effluent to the first reactor unit as the methane-containing gas.

2. The process of claim 1, comprising converting at least 90% of the carbon dioxide to methane.

3. The process of claim 1, wherein the hydrogen is mixed with the cooled exhaust stream intermediate the first reaction zone and second reaction zone.

4. The process of claim 1, wherein the catalyst in the first reaction zone comprises one or more of platinum, palladium, and rhodium, and wherein the catalyst in the second reaction zone comprises one or more of ruthenium and cobalt.

5. The process of claim 1, wherein cooling comprising maintaining the first reaction zone and the second reaction zone at a temperature in a range from about 650° F. to about 720° F.

6. The process of claim 1, further comprising maintaining the first reaction zone and the second reaction zone at a pressure in a range from about 25 to about 45 psig.

7. The process of claim 1, wherein:
    the fuel comprises one or more of coal, wood, or a hydrocarbon mixture; and
    the oxygen-containing gas is one or selected from the group consisting of air, oxygen-enriched air, and purified oxygen.

8. The process of claim 1, further comprising one or both of:
    compressing the methane-containing gas; and
    condensing water out of the methane-containing gas.

9. The process of claim 1, further comprising one or both of:
    feeding the oxygen-containing gas to the first reactor unit at a flow rate to provide greater than stoichiometric oxygen; and
    feeding hydrogen to the second reaction zone at a flow rate to provide less than stoichiometric hydrogen.

10. The process of claim 1, wherein the first reactor unit is a firebox comprising a radiant zone, a convective zone, and an exhaust zone, and wherein the second reactor unit is disposed in either the convective zone or the exhaust zone.

11. The process of claim 10, further comprising reducing a temperature of the combustion products stream, the cooled exhaust stream, or the effluent from the second reactor unit via indirect heat exchange with one or more of a water stream, a steam stream, a fuel stream, a hydrocarbon containing stream, or an oxygen-containing gas.

12. The process of claim 1, further comprising controlling a pressure of the cooled exhaust stream by opening or closing a valve of a vacuum protection unit.

* * * * *